(12) United States Patent
Wiesinger et al.

(10) Patent No.: US 10,748,387 B2
(45) Date of Patent: Aug. 18, 2020

(54) DEVICE FOR READING A MAGNETIC STRIPE AND/OR CHIP CARD HAVING A CAMERA FOR THE DETECTION OF INSERTED SKIMMING MODULES

(71) Applicant: Wincor Nixdorf International GmbH, Paderborn (DE)

(72) Inventors: Torsten Wiesinger, Untergruppenbach (DE); Alexander Drichel, Bielefeld (DE); Steffen Priesterjahn, Paderborn (DE); Dieter Schliebe, Bad Wuennenberg (DE)

(73) Assignee: Wincor Nixdorf International GMBH, Paderborn (DE)

( * ) Notice: Subject to any disclaimer, the term of this patent is extended or adjusted under 35 U.S.C. 154(b) by 104 days.

(21) Appl. No.: 15/695,695

(22) Filed: Sep. 5, 2017

(65) Prior Publication Data

US 2018/0040206 A1 Feb. 8, 2018

Related U.S. Application Data

(63) Continuation of application No. 14/647,301, filed as application No. PCT/EP2013/074706 on Nov. 26, 2013, now Pat. No. 9,754,462.

(30) Foreign Application Priority Data

Nov. 26, 2012 (EP) ..................................... 12194205

(51) Int. Cl.
*G07F 19/00* (2006.01)
*G06K 7/00* (2006.01)
*G06K 7/08* (2006.01)

(52) U.S. Cl.
CPC ....... *G07F 19/2055* (2013.01); *G06K 7/0004* (2013.01); *G06K 7/0056* (2013.01); *G06K 7/083* (2013.01); *G07F 19/207* (2013.01)

(58) Field of Classification Search
CPC . G07F 19/2055; G07F 19/207; G06K 7/0004; G06K 7/0056; G06K 7/083
See application file for complete search history.

(56) References Cited

U.S. PATENT DOCUMENTS 7,458,516 B2 * 12/2008 Masterton ............ G06K 7/0013
235/453
8,640,947 B1 * 2/2014 Lewis ................... G07F 19/209
235/379

(Continued)

FOREIGN PATENT DOCUMENTS

JP 2008027259 A * 2/2008

OTHER PUBLICATIONS

Li et al. "A Contour-Based Approach to Multisesnor Image REgistration." Mar. 1995. IEEE Transactions on Image Processing. vol. 4, No. 3. pp. 320-334.*

*Primary Examiner* — Thien M Le
*Assistant Examiner* — Asifa Habib
(74) *Attorney, Agent, or Firm* — Black, McCuskey, Souers & Arbaugh LPA

(57) ABSTRACT

The invention relates to a device (10) for reading a magnetic stripe and/or chip card comprising a card reader (16) for reading out data from the magnetic stripe and/or chip card, said card reader having a transport path (14) along which the magnetic stripe and/or chip card is moved when it is inserted into the card reader (16) and/or when it is removed from the card reader (16) and/or is received during the readout of data. Further, the device (10) has an image capturing unit (20) for capturing images of the card reader (16), the card reader (16) being designed such that by means of images captured by the image capturing unit (16) it can be detected whether a skimming module is inserted into the transport path (14) of the card reader (16).

19 Claims, 5 Drawing Sheets

(56) References Cited

U.S. PATENT DOCUMENTS

| | | | |
|---|---|---|---|
| 9,147,324 B2* | 9/2015 | Lin | G07F 19/20 |
| 9,793,677 B1* | 10/2017 | Jhon | H01S 3/10046 |
| 2007/0200928 A1* | 8/2007 | O'Doherty | G07F 19/20 |
| | | | 348/143 |
| 2007/0257102 A1* | 11/2007 | Hynes | G06K 7/082 |
| | | | 235/380 |
| 2008/0191860 A1* | 8/2008 | Flook | G06T 7/001 |
| | | | 340/506 |
| 2009/0201372 A1* | 8/2009 | O'Doherty | G07F 19/20 |
| | | | 348/150 |
| 2011/0248651 A1* | 10/2011 | Madey | H05H 7/00 |
| | | | 315/507 |
| 2012/0038772 A1* | 2/2012 | Priesterjahn | G07F 19/207 |
| | | | 348/150 |
| 2012/0038773 A1* | 2/2012 | Priesterjahn | G07F 19/20 |
| | | | 348/150 |
| 2012/0038775 A1* | 2/2012 | Priesterjahn | G07F 19/20 |
| | | | 348/150 |
| 2012/0200671 A1* | 8/2012 | Silveira | G07F 19/20 |
| | | | 348/150 |
| 2013/0146662 A1* | 6/2013 | Randolph | G06K 7/0056 |
| | | | 235/439 |
| 2014/0054459 A1* | 2/2014 | Scott | G07F 9/02 |
| | | | 250/338.1 |
| 2014/0372305 A1* | 12/2014 | Ray | G06Q 10/06 |
| | | | 705/44 |

* cited by examiner

DEVICE FOR READING A MAGNETIC STRIPE AND/OR CHIP CARD HAVING A CAMERA FOR THE DETECTION OF INSERTED SKIMMING MODULES

The invention relates to a device for reading a magnetic stripe and/or chip card, which comprises a card reader for reading out data from a magnetic stripe and/or chip card, which card reader has a transport path along which the magnetic stripe and/or chip card is moved when it is inserted into the card reader and/or removed from the card reader. Further, the device has an image capturing unit for capturing images of the card reader.

Such devices for reading magnetic stripe and/or chip cards are used in particular in automated teller machines, automatic cash register systems, automatic cash safes and payment terminals. The magnetic stripe and/or chip card is in particular an EC (electronic cash) card or a credit card by means of which purchased goods are paid or money is to be withdrawn. In order to obtain the account data stored on the magnetic stripe and/or chip card and the associated PIN, illegal skimming attacks are performed in which a so-called skimming module is provided in front of the slot into which the magnetic stripe and/or chip card is inserted, by means of which skimming module the data of the magnetic stripe and/or chip card are read out. In addition, the PIN is spied out, for example, by means of a camera which is mounted in a hidden manner or a manipulation of the keypad so that the person performing this skimming attack knows both the data of the magnetic stripe and/or chip card and the associated PIN and thus can withdraw money or make purchases in an unauthorized manner.

For blocking such skimming attacks, it is known from document DE 10 2011 001 541 A1 to provide a camera on an automated teller machine, by means of which camera the location area in front of the automated teller machine is detected. By means of image processing programs it is determined whether in addition to the person using the automated teller machine a further person which possibly might try to spy out data is present in the location area. The image taken by the camera can, for example, be shown in the display of the automated teller machine.

For blocking skimming attacks, it is known from document DE 10 2011 010 737 A1 to capture an image of the automated teller machine by means of a camera at predetermined time intervals and/or after a movement of objects in the area in front of the automated teller machine and to compare this image with a target image. By means of this image comparison it can be determined whether objects, in particular skimming modules, have been mounted to the automated teller machine without permission.

Further methods for blocking skimming attacks, in which the automated teller machines themselves or the area in front of the automated teller machine is monitored by means of a camera are, for example, known from documents DE 10 2010 036 961 A1, DE 10 2009 018 322 A1, and DE 10 2009 081 320 A1.

All these known camera-based methods for blocking skimming attacks have in common that by means of the camera only the outer area of the automated teller machine or of the device in which the device for reading the magnetic stripe and/or chip cards is installed is monitored.

In order to circumvent such methods for blocking skimming attacks, recently miniature skimming modules are inserted into the transport path of the card reader, in particular into the slot into which also the magnetic stripe and/or chip card is inserted. The data are read out by means of these miniature skimming modules. Such skimming modules inserted into the card reader cannot be detected by means of the known methods for blocking skimming attacks.

It is the object of the invention to specify a device for reading a magnetic stripe and/or chip card, by means of which skimming modules inserted into the transport path of the card reader of the device can reliably be detected in an easy manner.

Here, this object is solved by the device having the features of claim 1. Advantageous developments of the invention are specified in the dependent claims.

According to the invention, the card reader is designed such that by means of images captured by the camera it is detectable whether a skimming module for spying out data of the magnetic stripe and/or chip card is received in the transport path of the card reader.

Since the card reader is constructively designed such that by means of the camera it can also be detected whether a skimming module is inserted into the transport path of the card reader, also the novel miniature skimming modules inserted into the slot of the card reader can be detected by means of the camera so that corresponding manipulation attempts can easily be prevented.

Transport path of the card reader is in particular defined as the entire path from the slot of the card reader through which the magnetic stripe and/or chip card can be inserted up to the receiving area in which the card is received during the readout of the data from the magnetic stripe and/or the chip of the magnetic stripe and/or chip card, and preferably including this receiving area.

The detection unit is in particular a camera, preferably a digital camera, by means of which images with a representation of a detection area of the camera are captured.

Further, it is advantageous when a control unit is provided which compares an image of the card reader captured by means of the image capturing unit with a target image, and when, dependent on the result of this comparison, the control unit detects whether a skimming module is inserted into the transport path. Here, the target image is in particular stored in the control unit. The control unit in particular compares image data of the image captured by means of the image capturing unit with stored image data of the target image and, dependent on this comparison, detects whether there is a deviation between the images from which it can be inferred that a skimming module has been inserted into the transport path.

For the image comparison, the control unit in particular executes a predetermined image processing program. Preferably, a pattern comparison and/or a so-called matching is performed by means of the control unit.

The control unit divides the captured image preferably into at least two segments and compares these segments with corresponding segments of the target image. By means of this segment comparison, it can easily be determined whether there is a deviation between the captured image and the target image, which deviation can be attributed to a skimming module. Additionally or alternatively, the control unit can determine the contour of at least one object in the captured image and compare it with corresponding contours in the target image. In this way, too, skimming modules can easily be detected within the card reader. By contour in particular the outline of the representation of an object in the images is meant.

Additionally or alternatively, at least one object can be detected by the control unit in the captured image. In particular, such an object detected in a captured image is measured by means of image processing mechanisms, the determined dimensions being compared with preset target dimensions and the presence of a skimming module can be inferred from possibly determined deviations. In this way, too, an easy reliable detection of skimming modules is possible. The image capturing unit is in particular received outside the card reader so that by means of it an image of at least a partial area of the outside of the card reader can be captured.

The card reader is preferably designed such that at least a partial area of the card reader is transparent. The image captured by the image capturing unit comprises a representation of at least a part of the transparent partial area so that the camera can image a partial area of the transport path through the transparent partial area. Thus, by means of an image comparison with the target image it can easily be detected whether a skimming module is inserted into this transparent area of the transport path.

In a further embodiment, at least one through hole can be provided in a delimiting element delimiting the transport path at least in part, the image captured by the image capturing unit at least comprising the area of this through hole. In this way, it is achieved that the camera can "look into" the transport path of the card reader through the through hole so that by means of the image capturing unit it can easily be detected whether a skimming module is inserted.

In a particularly preferred embodiment not only one single through hole but a plurality of through holes which are arranged to form a predetermined hole pattern is provided in the delimiting element. As a result, the entire transport path or at least a large area thereof can be monitored.

In a particularly preferred embodiment, the image capturing unit is arranged at a first side of the transport path and a light source for transilluminating the card reader is provided at a second side of the transport path opposite to the first side. In the embodiment with the one through hole above the hole pattern thus the through holes are transilluminated by the light of the light source so that they act as backlight. As a result, it can easily be detected whether an object, in particular a skimming module, is arranged in the transport path in the area of at least one of the through holes, which skimming module prevents that the light from the light source reaches the camera.

In the embodiment with the transparent partial area, too, it is achieved by means of the provision of a light source that an inserted skimming module can be better detected by the camera through the transparent material so that a particularly reliable detection of skimming modules is possible.

In a further embodiment, a projection unit for projecting a predetermined pattern onto a side of a delimiting element of the card reader delimiting the transport path, which side faces the transport path, is provided within the card reader, wherein the image captured by the image capturing unit comprises a representation of at least a detail of the projected pattern. If a skimming module is arranged in the transport path, it changes the structure of the surface onto which the pattern is projected so that the representation of the pattern in the image captured by means of the image capturing unit changes. Such a change can easily be detected by means of the image comparison with the target image so that a skimming module can reliably be detected.

The pattern is in particular designed in the form of a grid and/or a point-shaped pattern. Such a grid enables a particularly easy detection of objects.

Preferably, the control unit determines in the representation of the pattern the position of preset elements of the pattern and compares this determined position with a target position of the respective element in the target image. In this way, changes between the target image and the actual representation in the captured image can be noticed and thus skimming modules can be detected. When using a grid pattern, in particular the positions of the intersections of the grid lines are determined and compared with target positions.

In a further embodiment, a light source for emitting pulsed light onto at least a partial area of the transport path can be provided within the card reader. The capturing of the image by means of the image capturing unit is synchronized with the pulsed light, the image captured by the image capturing unit comprising a representation of at least a detail of the partial area of the transport path illuminated by the pulsed light. Such a pulsed light synchronized with the image capturing enables in an easy manner that distances within the card reader can be measured in the captured images so that inserted skimming modules can be detected by means of comparisons of the distances with predetermined target distances.

The image capturing unit is in particular arranged within the card reader so that by means of it the partial area illuminated with the pulsed light and/or the area onto which the pattern is projected can easily be detected.

In an alternative embodiment, the image capturing unit can also be arranged outside the card reader. In this case, at least one optical deflecting unit, for example a reflecting prism, is provided by means of which the detection area of the image capturing unit is deflected into the transport path of the card reader.

The device for reading a magnetic stripe and/or chip card, as described above, is in particular received in an automated teller machine, an automatic cash register system, an automatic cash safe and/or a payment terminal.

Further, the device preferably comprises an information output unit by means of which information on the detection of a skimming module can be output. In this way, it is achieved that countermeasures can be taken immediately. Preferably, the device is connected via a data transmission connection to a central processing unit via which a service company in charge and/or security staff can be informed. In addition, a corresponding message can be output to a user via an output unit, e.g. a display of the device, so that this user is warned and does not insert any magnetic stripe and/or chip card into the card reader. Further, the insertion of magnetic stripe and/or chip cards can also be inhibited mechanically.

Further features and advantages of the invention result from the following description which explains the invention in more detail on the basis of embodiments in connection with the enclosed Figures.

Figure 1:
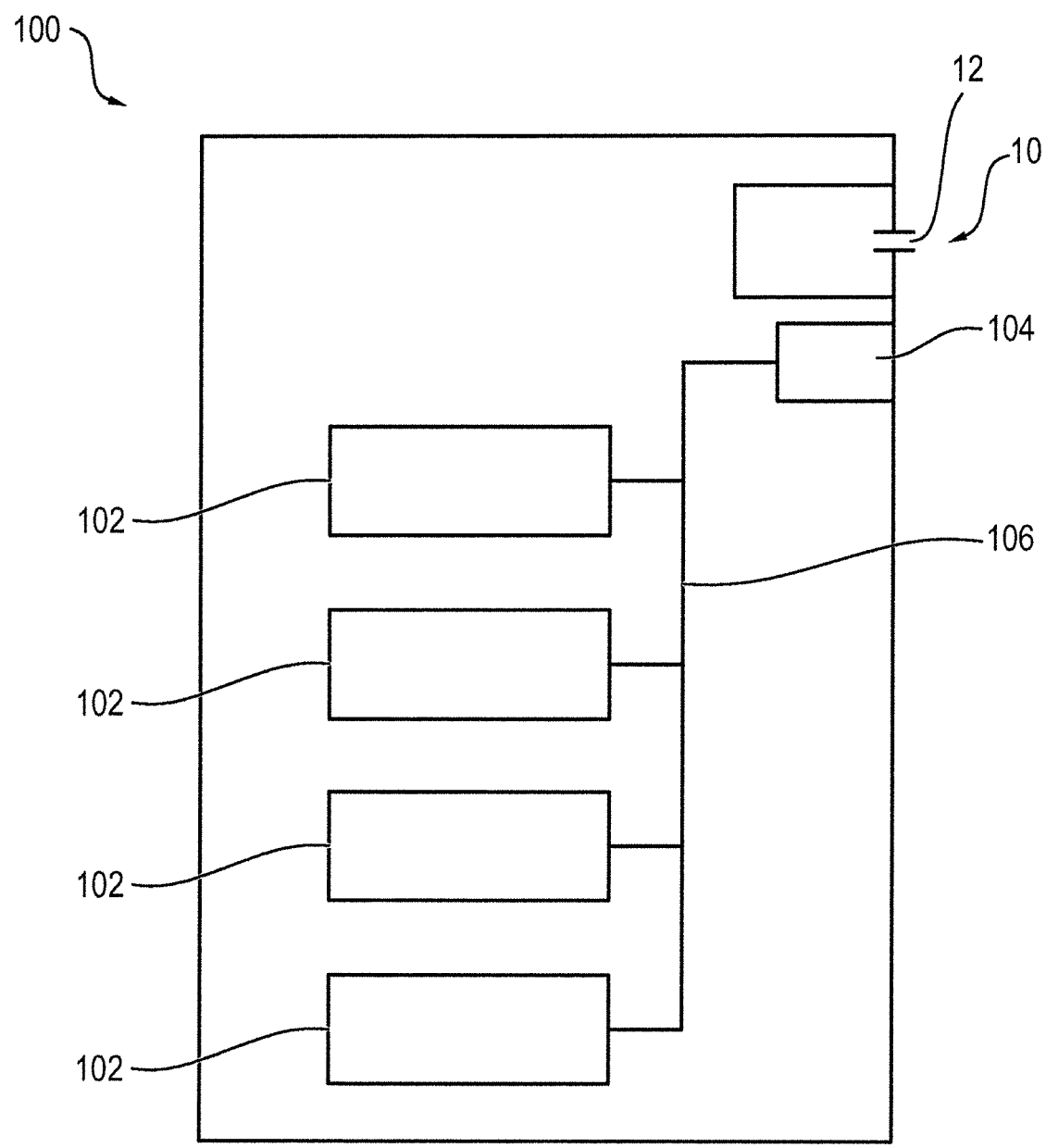
FIG. 1 shows a schematic illustration of an automated teller machine.

In FIG. 1, a schematic illustration of an automated teller machine 100 is illustrated, which comprises a device 10 for reading a magnetic stripe and/or chip card which can be fed to a card reader 16 of the device via a slot 12 of the device 10. Further, the automated teller machine 100 has four cash boxes 102 and an input and/or output unit 104 via which the notes of value can be withdrawn and/or deposited. For this, the input and/or output unit 104 is connected to the cash boxes 102 via a transport path 106.

Alternatively, the device 10 for reading out data of a magnetic stripe and/or chip card can also be inserted into any other device, in particular an automatic cash register system, an automatic cash safe and/or a payment terminal. The magnetic stripe and/or chip card is in particular an EC (electronic cash) card, a credit card and/or a payment card.

In the case of novel skimming attacks, a skimming module is inserted via the slot 12 into the transport path 14 of the card reader 16 of the device 10, by means of which skimming module the data of an inserted magnetic stripe and/or chip card can be read out. Further, by means of a camera mounted in a hidden manner and/or an additional keypad mounted on the keypad of the automated teller machine 100 the PIN associated with the magnetic stripe and/or chip card is spied out so that a person performing the skimming attack knows both the data of the magnetic stripe and/or chip card and the PIN and can thus withdraw money and/or make purchases in an unauthorized manner.

Such skimming modules inserted within the transport path 14 in which usually only the magnetic stripe and/or the chip card is inserted during the read out by the card reader and/or when feeding and/or removing the magnetic stripe and/or chip card cannot be detected by known measures for blocking skimming attacks which are directed to the detection of skimming modules mounted in front of the slot 12. In order to be able to also detect such skimming modules arranged within the transport path 14, the methods and devices for blocking skimming attacks described in the following in connection with FIGS. 2 to 10 are applied.

Figure 2:
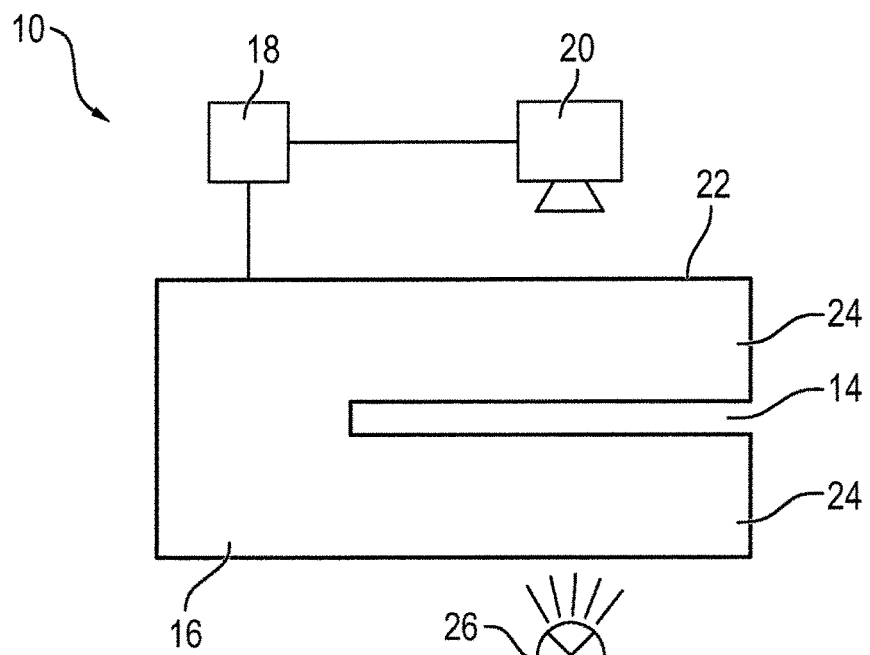
FIG. 2 shows a schematic illustration of a device for reading a magnetic stripe and/or chip card according to a first embodiment.
Figure 3:
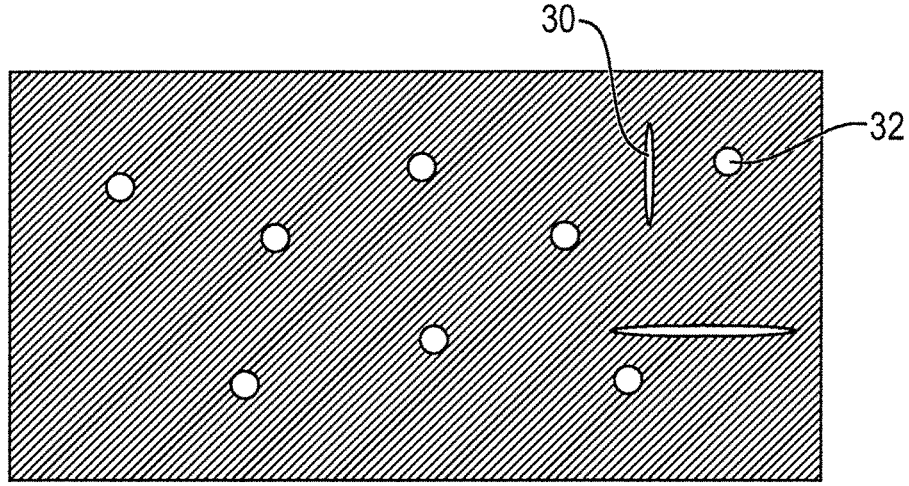
FIG. 3 shows an illustration of an image captured by means of the camera of the device according to FIG. 2.

In FIG. 2, a schematic illustration of a device 10 for reading a magnetic stripe and/or chip card according to a first embodiment is illustrated. The device 10 comprises, in addition to the card reader 16 with the transport path 14, a control unit 18 as well as an image capturing unit designed as a camera 20. By means of the camera 20, images with representations of the outside 22 of the card reader 16 are taken. Here, a hole pattern is provided at least in a partial area of the delimiting element 24 delimiting the transport path 14. At the side of the transport path 14 opposite to the camera 20 a light source 26 is arranged by means of which the hole pattern is transilluminated so that, provided that no object is inserted into the transport path 14, the corresponding hole pattern is illustrated as bright points in the image captured by the camera 20. In FIG. 3, an image captured by means of the camera 20 and showing the representation of the area transilluminated by the light source 20 is illustrated. Here, the individual through holes of the hole pattern are illustrated as bright elements, two of which being identified exemplarily with the reference sign 30, 32.

The control unit 18 in particular executes an image processing program by means of which the actual image captured by the camera 20 is compared with a preset target image of the hole pattern. By means of this comparison, the control unit can easily determine whether a skimming module is inserted into the transport path 14. If a skimming module is indeed inserted, then at least one of the holes of the hole pattern is covered so that no light of the light source 26 can pass therethrough and this hole is correspondingly not imaged in the image captured by means of the camera 20.

It is particularly advantageous when the different devices 10 make use of different hole patterns each time, so that the people performing the skimming attacks cannot adapt the form of their skimming modules to the hole patterns and thus skimming modules can be detected reliably.

Figure 4:
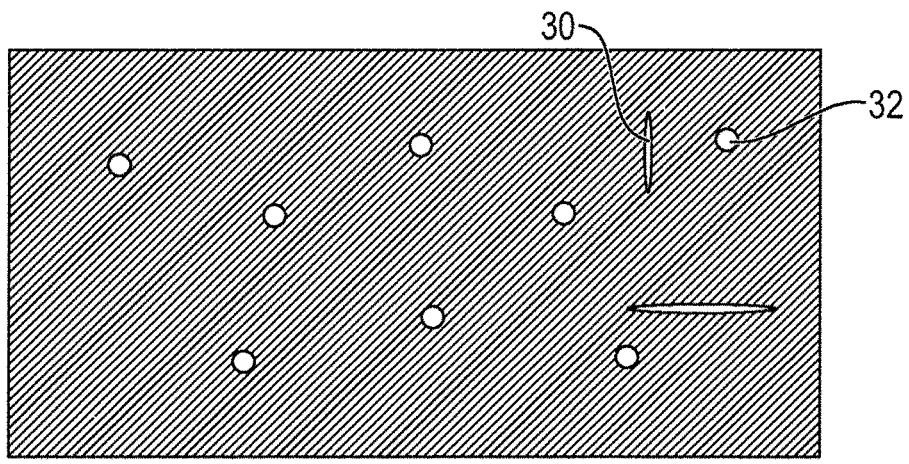
FIG. 4 shows an illustration of the image according to FIG. 3 during the image processing.

In FIG. 4, a schematic illustration of the actual image according to FIG. 3 is illustrated during the image processing by the control unit. During image processing, in particular distances between the holes are measured to thus determine the position of the holes. Alternatively or additionally, also other pattern recognition methods and/or matching methods can be used.

In an alternative embodiment, additionally or alternatively to the hole patterns also partial areas of the delimiting elements 24 can be designed in a partially transparent manner so that through these transparent areas an image of the inside of the card reader, in particular of the transport path 14, can be captured by means of the camera 20.

Figure 5:
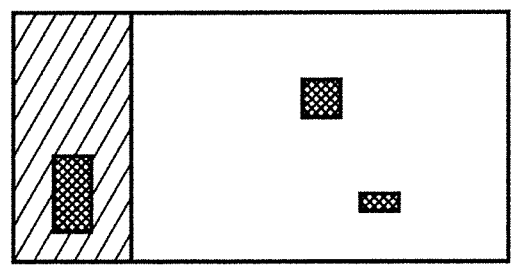
FIG. 5 shows an illustration of a further image captured by means of the camera according to FIG. 2 without skimming module.
Figure 6:
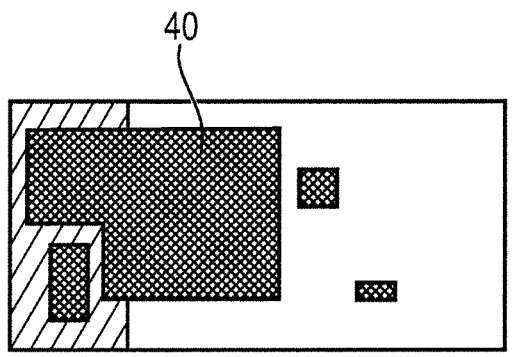
FIG. 6 shows an illustration of an image captured by means of the camera according to FIG. 2 with skimming module.

In FIG. 5, such an image captured by the camera 20 is illustrated, the image shown in FIG. 5 showing the state when no skimming module is inserted into the transport path 14. FIG. 6, on the other hand, shows an image captured by means of the camera 20 when a skimming module is inserted into the transport path 14. As shown by the comparison between FIGS. 5 and 6, in this case an angular dark object 40 can be seen in the image in FIG. 6, which is not present in FIG. 5.

This object 40 resulted from the fact that due to the skimming module the light of the light source 26 cannot transilluminate at this position or cannot transilluminate so strongly and thus a dark area is captured by the camera 20.

The control unit 10 in particular performs a segment analysis in which the images captured by means of the camera 20 are divided into segments and these segments are compared with predetermined segments of stored target images. Additionally or alternatively, also a contour determination of captured objects can take place and thus a comparison of contours can be made. Additionally or alternatively, the determined objects can also be measured and/or their position can be determined. Based on the corresponding image information gained during the image processing, it can reliably be detected each time by means of the comparison between the captured actual image and the predetermined target values whether a skimming module or another object which is usually not provided is arranged in the transport path 14.

Figure 7:
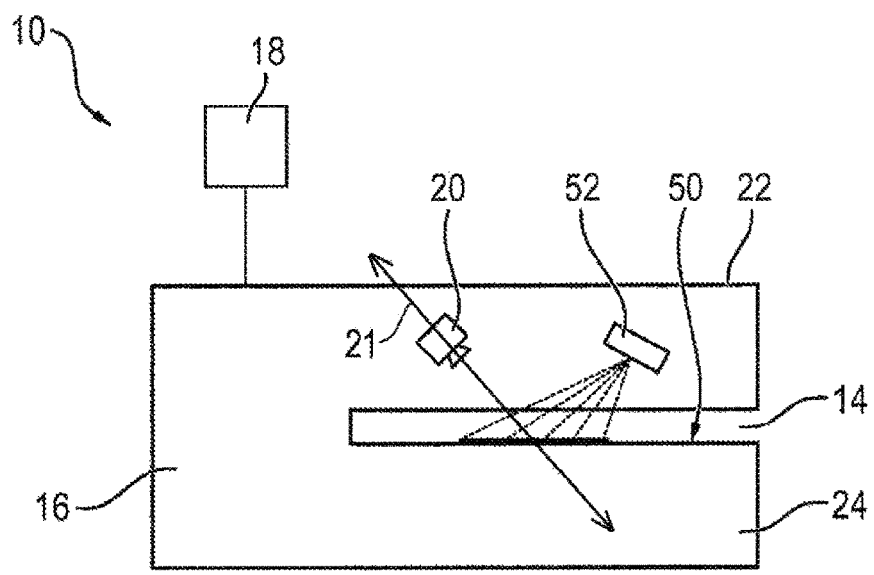
FIG. 7 shows a schematic illustration of a device for reading a magnetic stripe and/or chip card according to a second embodiment.
Figure 8:
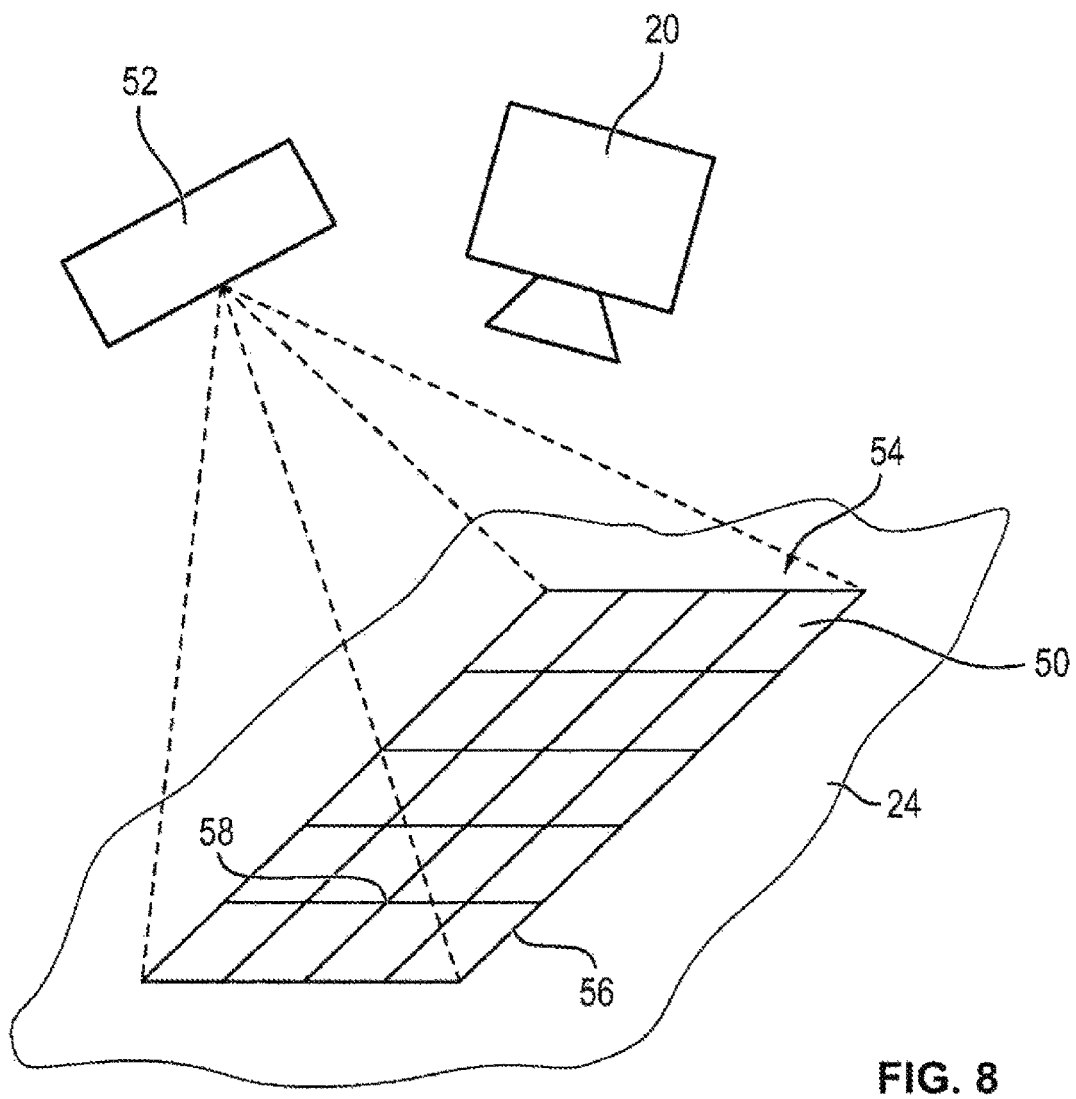
FIG. 8 shows a highly simplified illustration of the functioning of the device according to FIG. 7.

In FIG. 7, a schematic illustration of a device 10 for reading a magnetic stripe and/or chip card according to a second embodiment is illustrated. In this second embodiment, the camera 20 is arranged within the card reader 16 so that by means of it an image with a representation of at least a partial area of the surface 50 of the delimiting element 24 delimiting the transport path 14 can be captured. Further, a projection unit 52 is provided by means of which a predetermined pattern 54 is projected onto the surface 50 of the delimiting element 24 at least in a partial area. As shown in FIG. 7, the projection of the projection unit 52 is represented by dashed lines at a plurality of acute angles relative to the surface 50. FIG. 7 also shows a central axis 21 of the camera 20 at an acute angle relative to the surface 50. FIG. 7 also shows the projection unit 52 and camera 20 are on opposite sides of the projection on the surface 50. In FIG. 8, a schematic highly simplified illustration of this functional principle is illustrated.

In the example shown in FIG. 8, the pattern 54 is illustrated as a grid with orthogonally intersecting grid lines 56. When a skimming module is inserted into the transport path 14, then the surface condition of the surface onto which the pattern 54 is projected changes. As a result, also the position of the intersecting points 58 at which the grid lines 56 intersect each other changes. By means of a comparison of the positions of the individual intersections determined in the image captured by the camera 20 and the target positions according to the predetermined target image it can easily be detected if a skimming module is inserted.

In an alternative embodiment, also any other pattern can be projected which enables to detect an object in the region of the pattern 54 via the determination of changes of the pattern in the representations determined by the camera 20.

Figure 9:
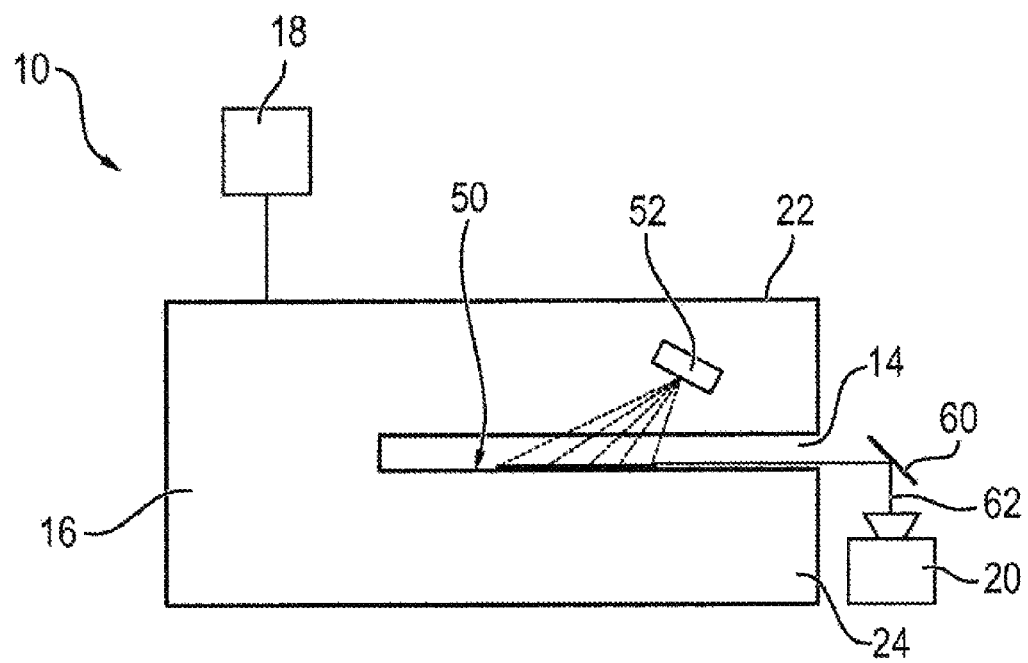
FIG. 9 shows a schematic illustration of a device for reading a magnetic stripe and/or chip card according to a third embodiment.

In FIG. 9, an illustration of a device 10 for reading a magnetic stripe and/or chip card according to a third embodiment is illustrated. In this embodiment, in contrast to the embodiment in FIG. 7, the camera 20 is not arranged within the card reader 16 but is provided outside the card reader 16. In this embodiment, an optical deflecting element 60, such as a reflecting prism, is provided by means of which the detection area of the camera 20 indicated by the line 62 is deflected such that by means of the camera 20 an image with a representation of the projected pattern 54 can be captured.

Figure 10:
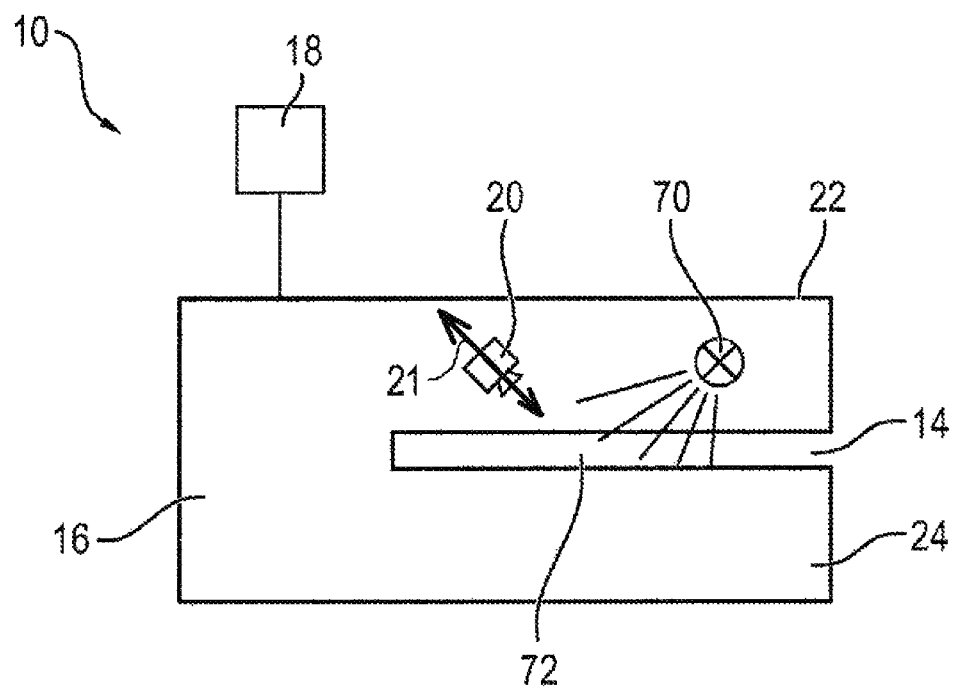
FIG. 10 shows a schematic illustration of a device for reading a magnetic stripe and/or chip card according to a fourth embodiment.

In FIG. 10, a schematic illustration of a device 10 for reading a magnetic stripe and/or chip card according to a fourth embodiment is illustrated. In this fourth embodiment, a light source 70 is provided within the card reader 16, by means of which a pulsed light is emitted onto at least a partial area 72 of the transport path 14. By means of the camera 20, at least an image with a representation of this partial area 72 is captured, wherein the images captured by means of the camera 20 are synchronized with the pulsed light of the light source 70. As a result, it is achieved that distances within the partial area 72 can easily be determined in the images captured by means of the camera 20 so that by means of deviations between determined distances and predetermined planned distances the presence of a skimming module in the transport path 14 can easily be detected. As shown in FIG. 10, the light projecting from the light source 70 is represented by solid lines and is directed at the area 72 from a first side of the area along the transport path 14 (the right side based on the perspective of FIG. 10). FIG. 10 also shows that the camera 20 is directed at the area 72 from a second side of the area opposite the first side along the transport path 14. FIG. 10 also shows the light source 70 directing light at the area 72 over an angular range that is defined between the two, outermost solid lines, with an angle centered at the point where the solid lines would intersect one another. FIG. 10 also shows that a central axis 21 of the camera 20 is at an acute angle relative to the transport path 14.

In an alternative embodiment of the invention, the individual embodiments described above can also be combined. By the simultaneous application of several of these embodiments, the reliability for the detection of skimming modules can be increased further. Moreover, in different partial areas of the transport path different of the afore-described embodiments can also be applied in parallel.

LIST OF REFERENCE SIGNS 10 device
12 slot
14 transport path
16 card reader
18 control unit
20 camera
22 outside
26, 70 light source
30, 32 through hole
40 segment
50 surface
52 projection unit
54 pattern
56 grid line
58 point of intersection
60 deflecting unit
62 detection area
100 automated teller machine
102 cash box
104 input and/or output unit
106 transport path

The invention claimed is:

1. A device for reading a magnetic stripe and/or chip card, comprising:
    a slot leading into the device and configured for receiving the magnetic stripe and/or chip card from an external location;
    a card reader configured to readout data from the magnetic stripe and/or chip card, having a transport path along which the magnetic stripe and/or chip card is moved when it is inserted in to the card reader and/or when it is removed from the card reader and/or in which the magnetic stripe and/or chip card is received during readout;
    a camera for capturing at least one image of the card reader and directed at a portion of the transport path that is spaced from the slot;
    wherein the portion of the transport path is at least partially transparent;
    wherein the card reader, based on the at least one image captured by the camera, detects whether a skimming module for spying out data from magnetic stripe and/or chip cards is received in the transport path of the card reader.

2. The device according to claim 1, wherein the card reader includes a control unit which compares the at least one image of the card reader captured by the camera with a target image stored therein, and that, dependent on the result of this comparison, the control unit detects whether a skimming module is received in the transport path.

3. The device according to claim 2, wherein the control unit executes a predetermined image processing program for the image comparison.

4. The device according to claim 2, wherein the control unit divides the at least one captured image into at least two segments, and compares them with corresponding segments of the target image, determines at least one contour in the captured image and compares it with contours in the target image, detects at least one object in the captured image and/or measures at least one object detected in the captured image and compares it with preset target dimensions.

5. The device according to claim 1 wherein the at least one image is of the inside of the card reader.

6. The device according to claim 1 further comprising:
a light source positioned to transilluminate the at least partially transparent portion of the transport path wherein the camera and the light source are on opposites sides of the transport path.

7. A device for reading a magnetic stripe and/or chip card comprising:
a card reader configured to read data from the magnetic stripe and/or chip card and comprising a transport path along which the magnetic stripe and/or chip card is moved when it is inserted into the card reader and/or when it is removed from the card reader and/or in which the magnetic stripe and/or chip card is received during readout;
a camera configured to capture at least one image of the card reader; and
within the card reader a projection unit is provided for projecting a predetermined pattern onto a surface of a delimiting element delimiting the transport path, which surface faces the transport path, and that the at least one image captured by the camera comprises a representation of at least a detail of the projected predetermined pattern;
wherein the card reader, based on the at least one image captured by the camera, can detect whether a skimming module for spying out data from magnetic stripe and/or chip cards is received in the transport path of the card reader.

8. The device according to claim 7 wherein the predetermined pattern comprises one of a grid pattern and a point-shaped pattern.

9. The device according to claim 7 further comprising:
a control unit configured to compare the at least one image of the card reader captured by the camera with a target image stored therein, and that, dependent on the result of this comparison, the control unit detects whether a skimming module is received in the transport path; and
wherein the control unit determines a position of preset elements of the predetermined pattern in the representation of the predetermined pattern in the at least one captured image and compares this position with a target position of the respective element in the target image.

10. The device according to claim 7 wherein the predetermined pattern is further defined as comprising a grid pattern.

11. The device according to claim 10 wherein the grid is further defined as including orthogonally intersecting grid lines.

12. The device according to claim 7 wherein the projection unit projects the predetermined pattern at a plurality of acute angles relative to the surface of the delimiting element.

13. The device according to claim 12 wherein a central axis of the camera 20 is at an acute angle relative to the surface of the delimiting element.

14. The device according to claim 13 wherein the projection unit and the camera are on opposite sides of the projected predetermined pattern on the surface of the delimiting element.

15. A device for reading a magnetic stripe and/or chip card comprising:
a card reader configured to read data from the magnetic stripe and/or chip card, which card reader comprises a transport path along which the magnetic stripe and/or chip card is moved when it is inserted in to the card reader and/or when it is removed from the card reader and/or in which the magnetic stripe and/or chip card is received during readout;
a camera for capturing at least one image of the card reader;
wherein the card reader, based on the at least one image captured by the camera, is configured to detect whether a skimming module for spying out data from magnetic stripe and/or chip cards is received in the transport path of the card reader;
wherein within the card reader a light source for emitting pulsed light onto at least a partial area of the transport path is provided, that the capturing of the at least one image by the camera is synchronized with the pulsed light, and that the at least one image captured by the camera comprises a representation of at least a detail of the at least partial area of the transport path illuminated by the pulsed light.

16. The device according to claim 15, wherein the camera is arranged within the card reader.

17. The device according to claim 15 wherein light projecting from the light source is directed at the at least partial area from a first side of the at least partial area along the transport path and the camera is directed at the at least partial area from a second side of the at least partial area opposite the first side along the transport path.

18. The device according to claim 17 wherein the light source is further defined as directing light at the at least partial area over an angular range.

19. The device according to claim 18 wherein a central axis of the camera is at an acute angle relative to the transport path.

* * * * *